US008692495B2

(12) United States Patent
Berger et al.

(10) Patent No.: US 8,692,495 B2
(45) Date of Patent: Apr. 8, 2014

(54) ROLLER MILL AND METHOD FOR SIZE REDUCTION OF GROUND MATERIAL

(76) Inventors: Markus Berger, Ennigerloh (DE); Franz-Josef Zurhove, Waldshut-Tiengen (DE); Ludger Kimmeyer, Beckum (DE); Carsten Sachse, Münster (DE)

( * ) Notice: Subject to any disclaimer, the term of this patent is extended or adjusted under 35 U.S.C. 154(b) by 492 days.

(21) Appl. No.: 13/055,183

(22) PCT Filed: Jul. 30, 2009

(86) PCT No.: PCT/EP2009/059883
§ 371 (c)(1), (2), (4) Date: Jan. 21, 2011

(87) PCT Pub. No.: WO2010/015564
PCT Pub. Date: Feb. 11, 2010

(65) Prior Publication Data

US 2011/0121772 A1 May 26, 2011

(30) Foreign Application Priority Data

Aug. 7, 2008 (DE) ......................... 10 2008 036 784

(51) Int. Cl.
*H02P 7/00* (2006.01)

(52) U.S. Cl.
USPC ............... 318/432; 241/35; 241/36; 241/117; 241/119; 241/121; 100/121; 100/155 R; 72/232; 73/862.55

(58) Field of Classification Search
USPC .................... 318/432, 727, 801, 560; 72/232; 73/862.55; 483/30; 363/40; 241/35, 36, 241/117, 119, 121, 189.2; 100/121, 155 R; 106/412, 757; 137/243.6; 700/164
See application file for complete search history.

(56) References Cited

U.S. PATENT DOCUMENTS

| | | | | |
|---|---|---|---|---|
| 4,208,620 | A * | 6/1980 | Ringland | 318/111 |
| 4,532,458 | A * | 7/1985 | Kuznetsov et al. | 318/111 |
| 4,566,299 | A * | 1/1986 | Koyama et al. | 72/10.2 |
| 4,896,837 | A | 1/1990 | Heinemann | |
| 5,386,945 | A | 2/1995 | Nose | |
| 5,485,965 | A * | 1/1996 | Hostettler et al. | 241/29 |
| 7,609,022 | B2 * | 10/2009 | Oyobe et al. | 318/800 |
| 2008/0149745 | A1 * | 6/2008 | Petersen | 241/23 |
| 2009/0261190 | A1 | 10/2009 | Hoffmann | |

FOREIGN PATENT DOCUMENTS

| | | | |
|---|---|---|---|
| DE | 19702854 | A1 | 7/1998 |
| DE | 20106177 | | 6/2001 |
| WO | 2008095902 | A | 8/2008 |
| WO | 2009030609 | A | 3/2009 |

* cited by examiner

*Primary Examiner* — Antony M Paul
(74) *Attorney, Agent, or Firm* — Renner Kenner Greive Bobak Taylor & Weber

(57) ABSTRACT

The invention relates to a roller mill having a grinding table, at least one grinding roller and at least two drives with a rotor winding for driving the roller mill and at least one adjustment device for adjusting the motor torque of at least one drive, the adjustment device being connected to the rotor winding of at least one drive in order to influence the rotor current.

19 Claims, 5 Drawing Sheets

ROLLER MILL AND METHOD FOR SIZE REDUCTION OF GROUND MATERIAL

TECHNICAL FIELD

The invention relates to a roller mill and a method for comminuting grinding stock, the roller mill having a grinding table, at least one grinding roller and at least two drives for driving the roller mill.

BACKGROUND OF THE INVENTION

In practice, there is generally driven in roller mills the grinding table which drives the grinding rollers via the grinding bed. However, this leads to significant fluctuations in performance levels and consequently to high loads on the drive train with the result that the drive power which can be reliably transmitted is very limited.

DE 38 01 728 describes a roller mill in which a drive motor is associated with each grinding roller. Furthermore, the grinding table has an auxiliary drive.

It has also already been suggested in DE 197 02 854 A1 to drive the rollers. It was also set out therein that the individual grinding rollers are, on the one hand, coupled with each other via the grinding table and the grinding stock or the grinding stock bed which is located thereon and, on the other hand, can have very different power consumptions which can be attributed, for example, to different rolling diameters on the grinding table (position of the force application point/radius), different effective diameters of the individual grinding rollers (for example owing to wear) and to different characteristics of the grinding stock being drawn in during interaction on the grinding table and grinding roller.

Even small speed variations between individual grinding rollers bring about relatively high power fluctuations in the drives. This can lead to the grinding rollers being constantly accelerated or decelerated, that is to say, the individually driven grinding rollers work against each other which leads to a significantly increased power or energy requirement during communition operation.

In DE-A1-197 02 854, it is therefore proposed that the operational fluctuations between the individual rotary drives of all the driven grinding rollers be compensated for by a common load compensation adjustment system. However, in the case of dynamic transmission changes between the grinding table and grinding roller, the power consumptions of the drives are very different.

DE-A1-10 2006 050 205 further discloses a roller mill whose grinding table is driven by an arrangement of more than two drives. For the drives, there are provided electric motors which are supplied by means of frequency converters and by means of which the speed and torque are adjusted. The frequency converters are organised in accordance with the master-slave principle in order to ensure that all the drives operate in a synchronous manner. However, these frequency converters result in high costs for the drive train.

DE 201 06 177 U1 relates to an edge mill with an additional drive which has a direct torque adjustment system.

SUMMARY OF THE INVENTION

An object of the invention is therefore to reduce the costs for the adjustment devices.

This object is achieved according to the invention by the features of claims 1 and 14.

The roller mill according to the invention has a grinding table, at least one grinding roller and at least two motors (drives) with a stator and a rotor winding for driving the roller mill and is provided with at least one adjustment device for adjusting the motor torque of at least one drive. The adjustment device is connected to the rotor winding of at least one drive in order to influence the rotor current.

In the method according to the invention for comminuting grinding stock with a roller mill which has a grinding table, at least one grinding roller, at least two drives with a stator and rotor winding for driving the roller mill, and at least one adjustment device for adjusting the motor torque, the adjustment device is connected to the rotor winding of at least one drive in order to carry out an a compensation adjustment operation by adjusting the motor torque. The adjustment is carried out by influencing the current of the rotor winding of at least one drive in order to adjust the power of the drives in a predetermined relationship relative to each other.

The rotor winding in the context of the invention is also intended to be understood to be a cage winding of an asynchronous motor with a cage rotor.

The influence of the motor torque is brought about by directly influencing the rotor current, the stator current thereby being indirectly influenced.

The influence of the rotor current can be brought about, for example, by converters whose power is dependent in this type of influence on the speed deviation between the operating and the nominal point which is generally ≤30% of the nominal motor power. Converters with a substantially lower power can consequently be used. Since the cost of the converters is almost proportional to their power, cost savings of up to 70% and more can be achieved in this case. The division of the drive of the roller mill over a plurality of drives further has the advantage that correspondingly smaller motors and more simple gear mechanisms can be used. Furthermore, the system can be configured in such a manner that the grinding operation does not have to be interrupted in the event of a malfunction of a drive (redundancy).

The dependent claims relate to further advantages and constructions of the invention.

The drives are preferably formed by asynchronous motors and the at least one motor to be influenced is formed in particular by a slip-ring motor. The power of the adjustment device may be less than 50%, preferably a maximum of 30%, of the nominal power of the associated drive. As adjustment devices, it is possible to use, for example, a frequency converter, a cascade arrangement of power converters or a matrix converter. It is conceivable for the adjustment device to be arranged so as to be fixed in position or so as to rotate with the rotor of the drive.

Owing to the correspondingly lower power of the adjustment device, it is possible to provide a low-voltage system whose voltage is, for example, a maximum of 690 V.

The at least two drives can selectively drive the grinding rollers and/or the grinding table.

BRIEF DESCRIPTION OF THE DRAWINGS

Other advantages and configurations of the invention are explained below with reference to the description and the drawings in which.

DETAILED DESCRIPTION OF THE INVENTION

Figure 1:
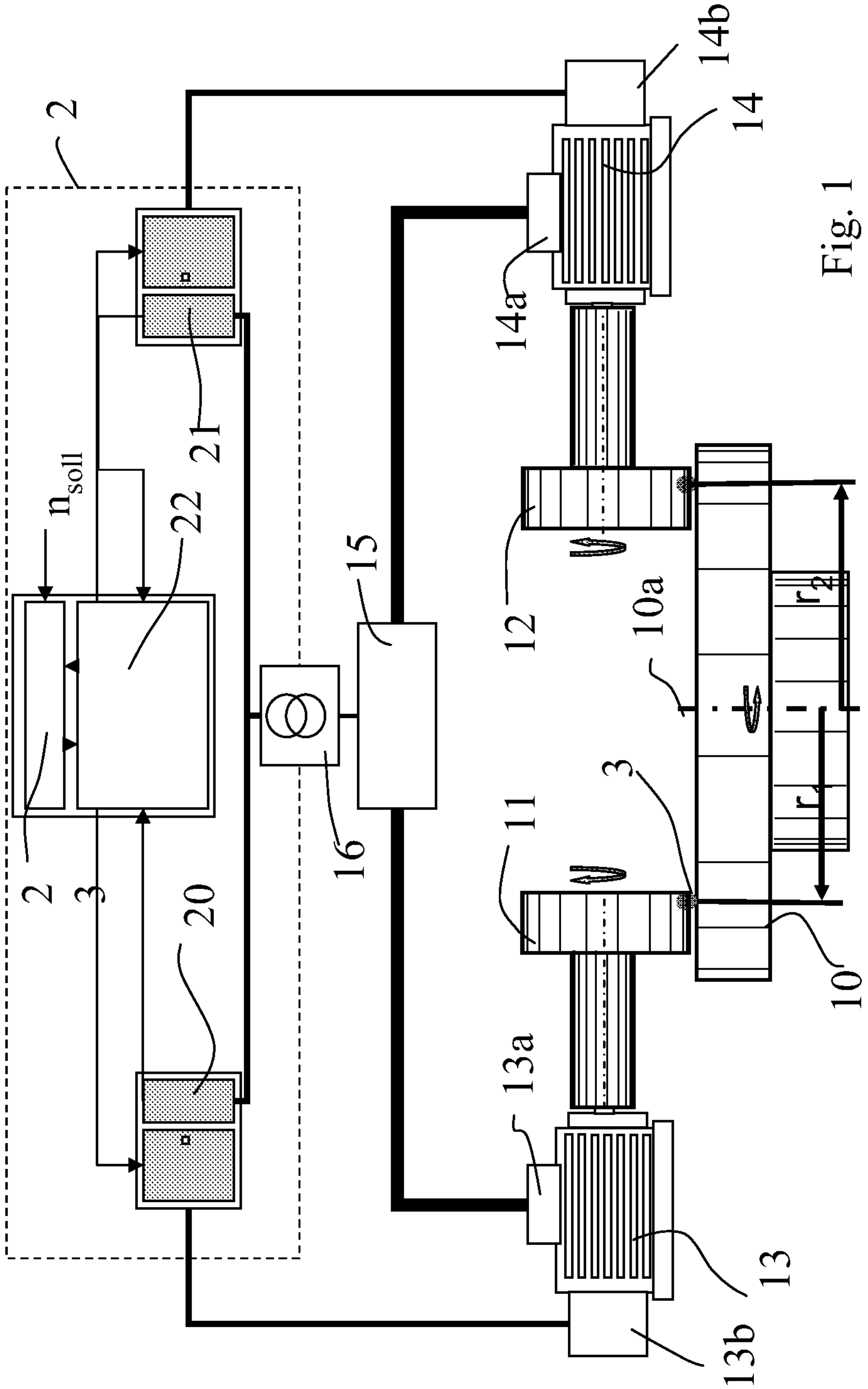
FIG. 1 is a schematic illustration of a roller mill having a compensation adjustment device.

The roller mill 1 illustrated in FIG. 1 has a grinding table 10, at least two grinding rollers 11, 12 and at least two drives 13, 14 for driving the two grinding rollers 11, 12. Each drive comprises a motor and optionally a gear mechanism. In the context of the invention, it is of course also possible to provide a plurality of grinding rollers, in particular three, four or more grinding rollers.

The grinding table 10 can freely rotate about a rotation axis 10*a* so that it is caused to rotate only by the driven grinding rollers 11, 12 and the grinding stock 3 located between the grinding roller and grinding table. However, it would also be conceivable for a separate drive which comprises at least one motor to be associated with the grinding table.

The transmission of the rotation movement of the grinding rollers 11, 12 to the grinding table 10 is carried out via the grinding stock 3. Owing to the grinding stock bed not being constructed in a uniform manner in practice, the transmission ratio from the grinding roller to the grinding table changes continuously. The transmission ratio is ultimately determined by the spacing of the force application point between the grinding roller axis and the grinding table axis. In the drawings, the spacing $r_1$ of the force application point of the grinding roller 11 with respect to the rotation axis 10*a* is smaller than the spacing $r_2$ of the force application point of the grinding roller 12 with respect to the rotation axis 10*a*.

However, a transmission ratio which is only slightly different leads to different torques being transmitted to the grinding table when the speed of the grinding rollers 11, 12 is almost the same. One drive is thereby braked or accelerated with respect to the other drive.

A load compensation adjustment system and the relatively similar torques which are associated therewith also lead to different power levels owing to the different transmission ratios. The resultant significant power fluctuations of the drives result in an increased energy requirement. Furthermore, the desired power distribution between the drives is thereby disrupted.

In order to prevent these effects, a compensation adjustment device 2 is provided, the power of the drives 13, 14 being adjusted in a predetermined ratio relative to each other by adjusting the motor torque (and consequently optionally also the rotor speed) of at least one drive. In the embodiment illustrated, identical drives 13, 14 are provided for the two identically constructed grinding rollers 11, 12, so that the compensation adjustment device 2 keeps the power of the two drives at the same level.

However, it would also be conceivable, in addition to one or more grinding rollers, for the grinding table also to have a separate drive or for differently sized grinding rollers to be used. In these instances, the drives could be operated with different power levels.

In the embodiment illustrated, the compensation adjustment device 2 substantially comprises an adjustment device 20, 21 which is associated with the drives 13, 14, and which is constructed as a converter, a power compensation adjuster 22 and optionally a grinding table speed adjuster 23, respectively.

The drives 13, 14 are preferably formed by asynchronous motors, in particular slip ring motors, whose stator winding 13*a*, 14*a* is connected to a power supply network 14 (three-phase supply network, low or medium voltage) and whose rotor winding 13*b*, 14*b* is connected to the adjustment device 20 or 21, respectively. The adjustment devices 20, 21 are preferably low voltage systems with a maximum voltage of 690 V. They are therefore connected to the power supply network 15 optionally by means of a transformer 16.

The adjustment devices 20, 21 measure the current motor current and the motor voltage from the drives 13, 14. The power consumption of each drive is established from this and a sliding total mean value is formed which is weighted with a factor (in the case of identical power levels of the 2 drives illustrated in this instance=0.5) and constitutes the desired value of the drive. In the case of an almost constant resistance torque, this value is substantially dependent only on the speed of the respective drive.

A deviation between the actual power level of the drive and the desired power level of the drive is transmitted to the power compensation adjuster 22 which brings about a power adjustment of the two drives 13, 14 by the rotor current of the respective drive being adapted accordingly so that the power of the two drives is adjusted in the predetermined ratio, in this instance to the same level.

Advantageously, there is provided for the grinding table speed an additional adjustment system which is implemented in this instance by the grinding table speed adjuster 23. The grinding table speed adjuster 23 is connected to a grinding table speed sensor (not illustrated in greater detail) and receives at sufficiently small intervals the actual value of the speed of the grinding table 10 which is compared with the desired value $n_{Soll}$ from which the adjustment deviation is derived. With a fixedly assumed transmission ratio, the adjuster produces from this the desired speed for the power compensation device 22 which can change this value.

The adjustment device 20, 21 may also have an internal speed adjuster and a motor model which runs therewith, whereby the drive speed of the drives and the motor torque can be derived. Advantageously, the adjustment devices must be able to read or output control and status data every 5-10 ms so that the function of the compensation adjustment device is ensured.

In terms of technical control, the system is a cascade adjustment system, the individual levels being dynamically decoupled from each other and consequently being able to be considered individually. The advantage of the adjustment system described above is that with a power compensation adjustment system the power consumptions of the drives 13, 14 differ from each other only slightly and even significant changes in the system (transmission jump) are corrected very quickly.

Furthermore, it is advantageous that it is possible to almost completely dispense with costly and high-maintenance measurement technology since the converters used provide all the relevant data with the exception of the grinding table speed. With the adjustment devices 20, 21, the adjustment interventions can further be carried out in an almost power-free manner, so that the overall efficiency level is at the level of a non-adjusted drive.

The adjustment devices 20, 21 are advantageously formed by converters, it not being necessary for the entire power of the drives 13, 14 to be able to be adjusted by the adjustment device 20, 21, as was previously the case in the prior art. If the adjustment device is connected to the rotor winding of the drives, the rotor current can be influenced for adjustment. This manner of influencing the drives affords the possibility of the power of the adjustment devices being able to be selected to be significantly lower than the nominal power levels of the associated drives. Preferably, the power of the adjustment devices is less than 50%, preferably a maximum of 30%, of the nominal power of the associated drives. Since the costs of the adjustment devices which are constructed as converters are proportionally dependent on the power of the adjustment devices, 50% or 70% and more of the costs for the adjustment devices can be saved in this manner.

With reference to FIGS. 2 to 5, various embodiments for the adjustment device 20 or 21 are set out below.

Figure 2:
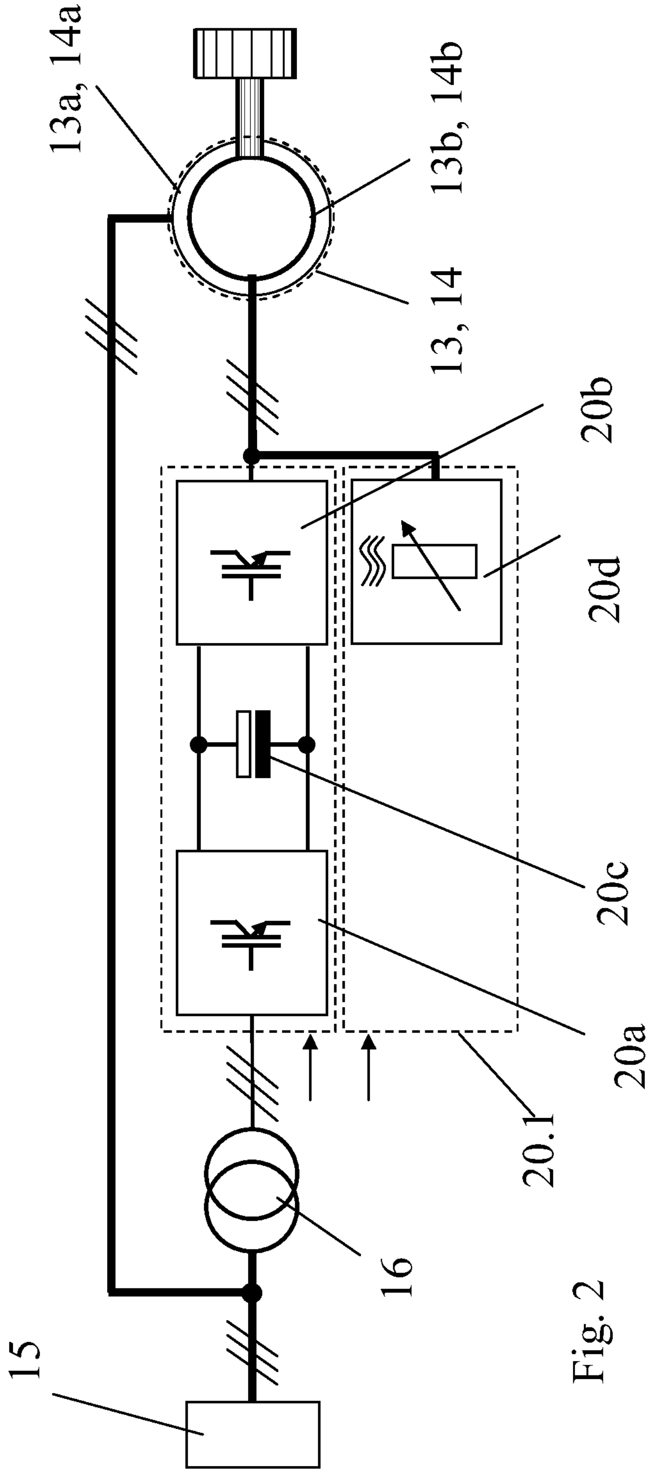
FIG. 2 is a schematic illustration of an adjustment device which is constructed as a frequency converter with an intermediate voltage circuit.

In the embodiment according to FIG. 2, the adjustment device 20 or 21 is constructed as a frequency converter 20.1 with an intermediate voltage circuit. It substantially comprises an input stage 20*a* and an output stage 20*b* and an intermediate circuit 20*c*. The input stage 20*a* converts the fixed-frequency three-phase current into direct current for the intermediate circuit, and vice-versa (return feed path), whilst the output stage converts the direct current into variable-frequency alternating current, and vice-versa. The intermediate circuit 20*c* has a capacitor and serves to decouple the input and output step (energy store).

With this adjustment device, a speed reduction (return feed of the energy into the power supply network) but also a speed increase (additional energy supply) are also possible. The magnetising of the motor can be influenced in a specific manner (which can also be illustrated as a capacitive load with respect to the power supply network).

Furthermore, it is possible to provide a start-up module 20*d* which is, however, only necessary when the drive 13, 14 must start running under nominal load (or above this). Then, during the start-up operation, the start-up module 20*d* is connected to the rotor winding in place of the adjustment device. If, however, the roller mill is started in a load-free manner (optionally at part-load <50% of the nominal load), this start-up module is not required.

Figure 3:
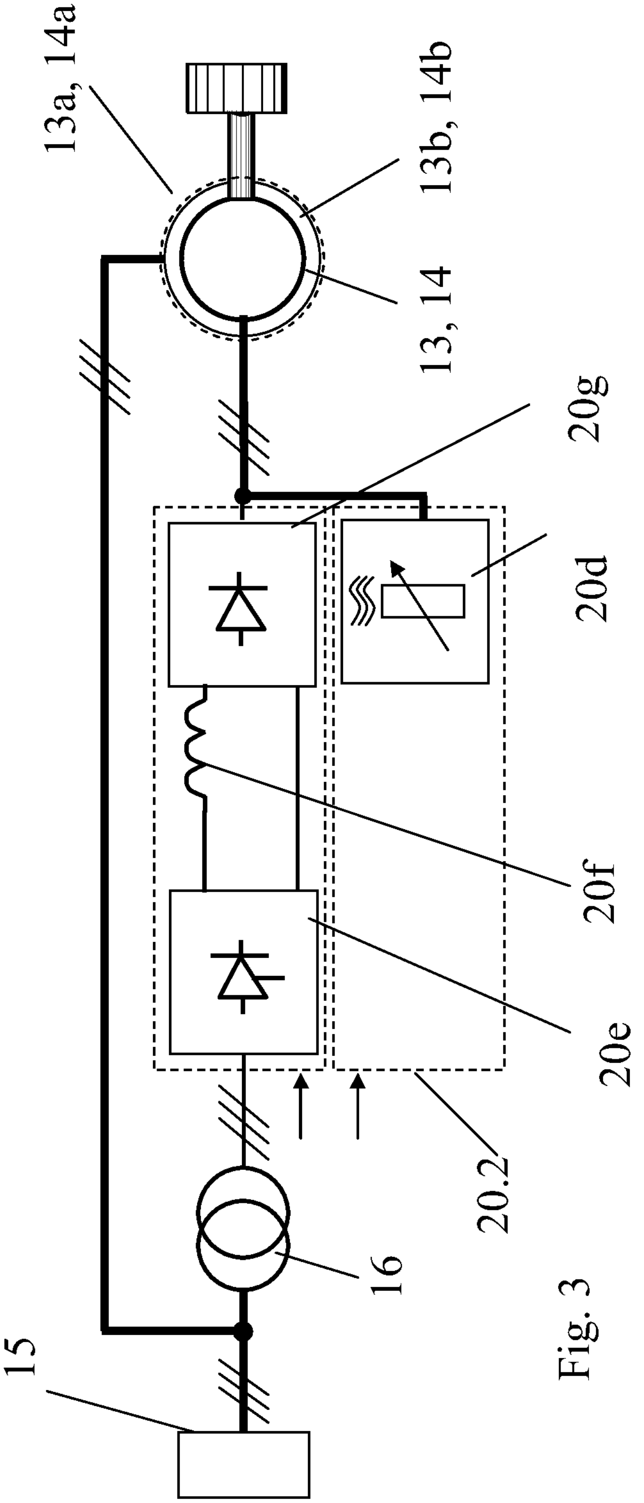
FIG. 3 is a schematic illustration of an adjustment device which is constructed as a cascade arrangement of power converters.

In FIG. 3, the adjustment device 20, 21 is configured as a cascade arrangement 20.2 of power converters. This is a sub-synchronous converter cascade. By means of specific current influence, the motor slip and consequently the speed or the motor torque of the drive can be influenced in a specific manner. To this end, the rotor current is rectified via a rectifier 20*e* and temporarily stored by means of an inductor 20*f*. Via a thyristor stage 20*g*, the power converter cascade can supply energy back to the power supply network.

The advantage of the power converter cascade is that operation close to the synchronous speed is unproblematic for the components. Furthermore, it involves fewer components than the frequency converter 20.1, it being possible in particular to dispense with the intermediate circuit capacitor, whereby the service-life is increased.

Figure 4:
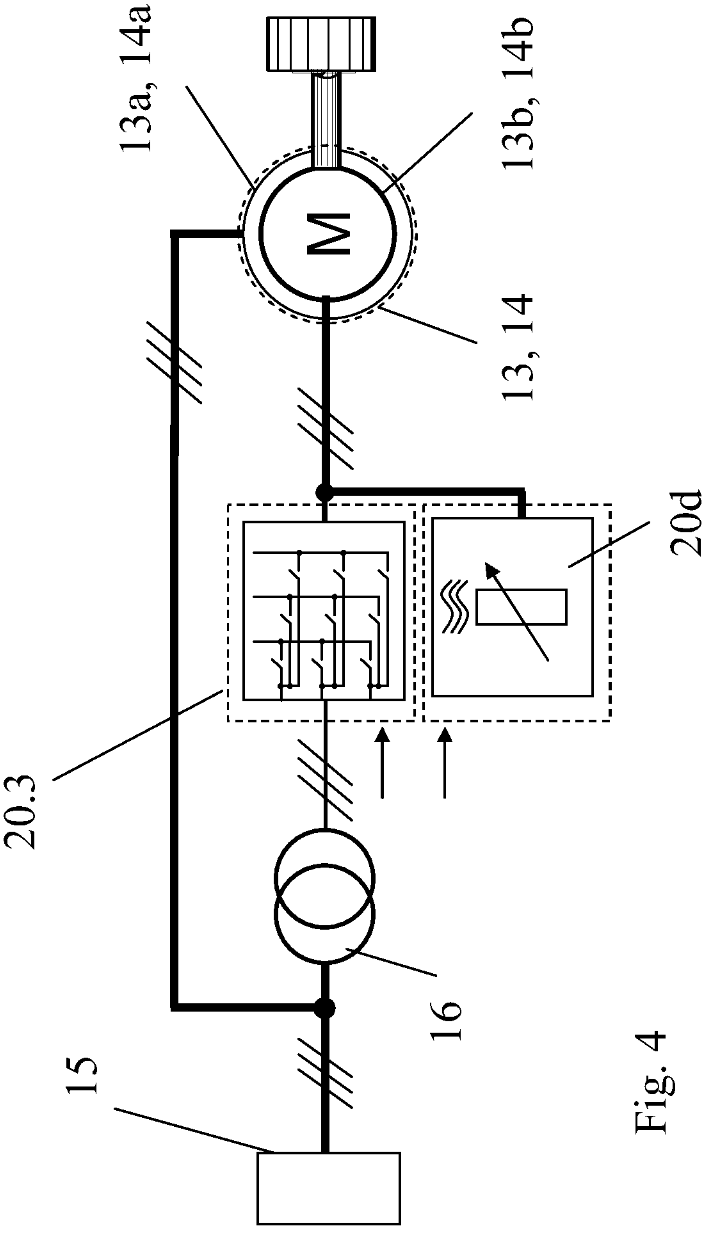
FIG. 4 is a schematic illustration of an adjustment device in the form of a matrix converter and FIG. 5 is a schematic illustration of an adjustment device which rotates with the rotor.

The adjustment device 20, 21 of the embodiment illustrated in FIG. 4 is formed by a matrix converter 20.3. Owing to corresponding switching elements, the fixed-frequency input phases are connected to each other without any timing errors in such a manner that the variable frequency output voltages can be produced. Energy flow in both directions is possible. The advantage of a matrix converter is that no storage modules (capacitor or inductor) are required. Also in this instance, operation close to the synchronous speed for the components is unproblematic owing to their operating method. Furthermore, energy flow is possible in both directions without additional components. This adjustment device may therefore have a better degree of efficiency than the other embodiments.

Figure 5:
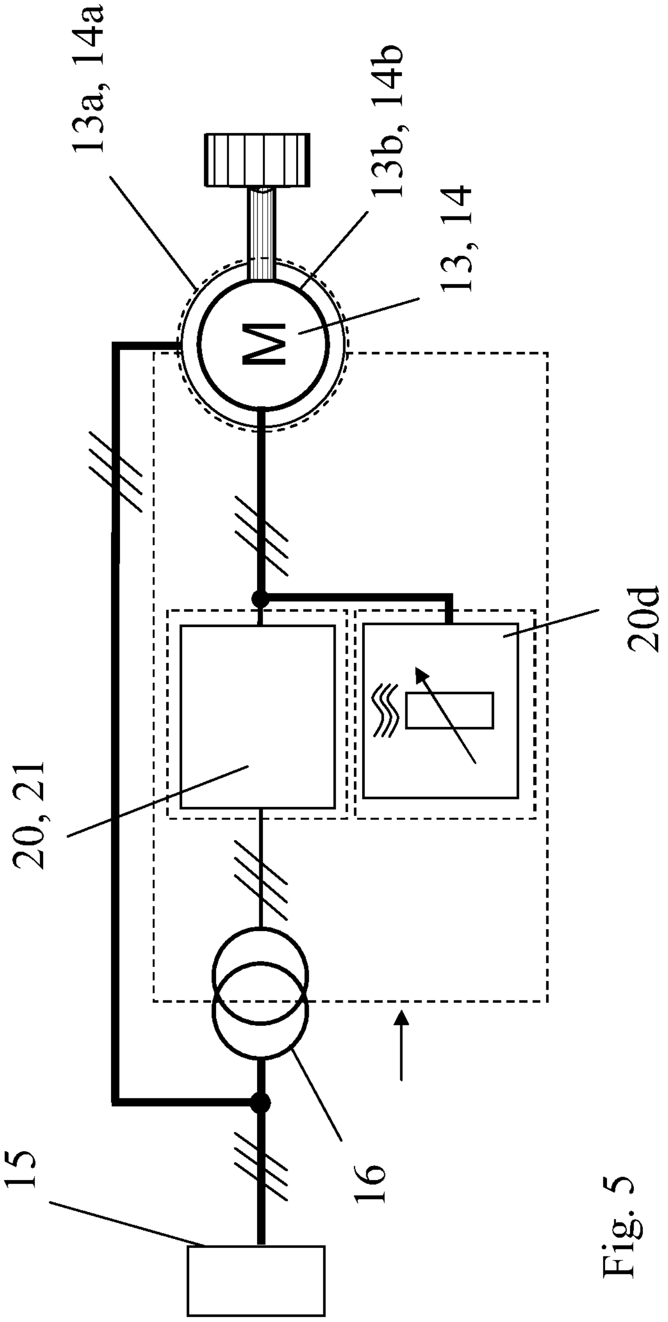

Finally, FIG. 5 is another schematic illustration of an adjustment device 20, 21 which co-rotates with the rotor winding 13*a*, 14*a*. This affords the possibility of transmitting the energy flow, for example, via an inductive coupling rather than via slip rings. It is thereby possible to dispense with slip rings.

Owing to the influence of the rotor current by the adjustment devices 20, 21, the power required for the adjustment devices can be configured in accordance with the speed deviation between the operating point and nominal point. The required power for the adjustment device will therefore generally be a maximum of 30% of the nominal motor power of the drive.

Whilst roller mills were previously generally driven only by the grinding table, and a correspondingly large drive was required, when a plurality of drives are used, it is also possible to use medium or low voltage motors which require significantly lower cabling and connection costs. Owing to the correspondingly lower power of the adjustment devices, it is also possible to use low voltage adjustment devices even when high motor power levels are intended to be adjusted.

It is consequently possible to implement the multi-motor drive in a more reliable and more economical manner than the conventional single-motor drive. It is also conceivable to have larger milling drive power levels without significant expense.

The invention claimed is:

1. Roller mill comprising: a grinding table, at least one grinding roller and at least two drives including a rotor winding and stator winding for driving the roller mill, wherein one of the at least two drives has an adjustment device associated therewith for adjusting the motor torque of the associated drive, characterised in that the adjustment device is connected to the rotor winding of at least one drive in order to influence the rotor current, and further characterized in that actual values of the drives are derived via a co-rotating motor model.

2. Roller mill according to claim 1, characterised in that the drives are formed by asynchronous motors.

3. Roller mill according to claim 1, characterised in that at least n−1 of the at least two drives are formed by slip-ring motors, wherein "n" equals the number of drives.

4. Roller mill according to claim 1, characterised in that the power of the adjustment device is less than 50% of the nominal power of the associated drive.

5. Roller mill according to claim 1, characterised in that the power of the adjustment device is a maximum of 30% of the nominal power of the associated drive.

6. Roller mill according to claim 1, characterised in that the adjustment device is a frequency converter.

7. Roller mill according to claim 1, characterised in that the adjustment device is a cascade arrangement of power converters.

8. Roller mill according to claim 1, characterised in that the adjustment device is a matrix converter.

9. Roller mill according to claim 1, characterised in that the adjustment device is a low voltage system.

10. Roller mill according to claim 1, characterised in that the voltage of the low-voltage system is a maximum of 690 V.

11. Roller mill according to claim 1, characterised in that the at least one grinding roller has at least one associated drive.

12. Roller mill according to claim 1, characterised in that the grinding table—has at least one associated drive.

13. Roller mill comprising: a grinding table, at least one grinding roller and at least two drives including a rotor winding and stator winding for driving the roller mill, wherein one of the at least two drives has an adjustment device associated therewith for adjusting the motor torque of the associated drive, characterised in that the adjustment device is connected to the rotor winding of at least one drive in order to influence the rotor current, and characterised in that the adjustment device rotates with the rotor of the drive.

14. Method for comminuting grinding stock with a roller mill, which has a grinding table, at least one grinding roller, at least two drives with a stator and a rotor winding for driving the roller mill, and at least one adjustment device for adjusting the motor torque, wherein a compensation adjustment operation is carried out by adjusting the motor torque of at least one drive, characterised in that actual values of the drives are derived via a co-rotating motor model and the adjustment device is connected to the rotor winding of at least one drive and the adjustment is carried out by influencing the current in the rotor winding in order to adjust the power of the drives in a predetermined relationship relative to each other.

15. Method according to claim 14, characterised in that the compensation adjustment is a load compensation adjustment.

16. Method according to claim 15 characterised in that the speed of the drives is adjusted in such a manner that a predetermined speed of the grinding table is further maintained.

17. Method according to claim 14, characterised in that the compensation adjustment is a power compensation adjustment.

18. Method according to claim 17 characterised in that the speed of the drives is adjusted in such a manner that a predetermined speed of the grinding table is further maintained.

19. Method according to claim 14, characterised in that the speed of the drives is adjusted in such a manner that a predetermined speed of the grinding table is further maintained.

* * * * *